United States Patent
Gu

(10) Patent No.: US 6,823,000 B1
(45) Date of Patent: Nov. 23, 2004

(54) METHOD AND APPARATUS FOR OPTIMAL DOT PRODUCT CALCULATION

(75) Inventor: Zhenguo Gu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/259,169

(22) Filed: Feb. 26, 1999

(51) Int. Cl.[7] ............................................. H04B 1/69
(52) U.S. Cl. ...................... 375/152; 375/142; 375/150; 375/152; 375/343; 370/441
(58) Field of Search ............................... 375/142, 150, 375/152, 343; 708/603, 625, 204, 212, 422; 370/441

(56) References Cited

U.S. PATENT DOCUMENTS

| | | | | |
|---|---|---|---|---|
| 5,032,865 A | * | 7/1991 | Schlunt | 708/603 |
| 5,274,675 A | * | 12/1993 | Granau et al. | 375/343 |
| 5,721,892 A | * | 2/1998 | Peleg et al. | 712/221 |
| 5,933,447 A | * | 8/1999 | Tran et al. | 375/152 |
| 6,237,014 B1 | * | 5/2001 | Freidin et al. | 708/422 |
| 6,434,163 B1 | * | 8/2002 | Fernando et al. | 370/441 |

OTHER PUBLICATIONS

Namgoong et al., Power Consumption of Parallel spread spectrum correlator architectures, IEEE, Lo power Electronics and Design, 1998. Proceedings., Aug. 1998, pp. 133–135.*

Altera, Using FLEX Devices as DSP Coprocessors, Feb. 1996, Technical Brief.*

* cited by examiner

*Primary Examiner*—Shuwang Liu
(74) *Attorney, Agent, or Firm*—Ronald O. Neerings; Wade James Brady, III; Frederick J. Telecky, Jr.

(57) ABSTRACT

A dot product operator (30) uses adder trees (10) of L-1 adders and no multiplication circuits, where L is the length of the parallel dot product operator. Exclusive-or gates 12 provide the function of multiplication by ±1, with the carry-in ports of adders (14, 16, 18, 20, 32, 34, 36, 42) being used to form the two's complement, resulting in an extremely efficient design in terms of area and power.

21 Claims, 2 Drawing Sheets

METHOD AND APPARATUS FOR OPTIMAL DOT PRODUCT CALCULATION

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to code division multiple access (CDMA) devices and, more particularly, to a method and apparatus for calculating a dot product for use therein.

2. Description of the Related Art

Spread spectrum communication devices have been used military and commercial devices for many years. These devices use noise-like waves to spread. (cover) the information bits so that transmission bandwidth is much wider than that required for simple point-to-point communication. DS-CDMA (Direct Spreading Code Division Multiple Access) is a form of spread spectrum which uses a conventional communication waveform and a pseudo-noise (PN) sequence; to transmit information. The PN sequence is commonly generated using a Linear Feedback Shift Register (LFSR). Thus, communication channels are separated by means of a pseudo-random modulation that is applied and removed in the digital domain, not on the basis of frequency, like frequency hopping CDMA.

CDMA has some significant advantages over other communication techniques, in particular it has improved capacity and quality as compared to narrowband multiple access wireless technologies.

Direct Spreading (DS) CDMA systems require correlation operations over two long data sequences in real time. One of the sequences is the 2×M bit wide complex number data and the other is the 2×1 bit complex PN sequence, where M is the data bit width. In correlation calculations, PN bits equal to "0" are mapped to "1" and PN bits equal to "1" are mapped to "−1". At a specific offset, the correlation becomes a complex number dot product operation, which can be formulated as:

$$S = \sum_{k=1}^{N} D(k)PN*(k)$$

where the data $D(k)=D(k)_I+jD(k)_Q$) and pseudo-noise sequence $PN(k)=PN(k)_I+jPN(k)_Q$, "*" is the complex conjugate operator and N is the vector length of the complex data and PN vectors.

In a high quality DS-CDMA system, a parallel dot product operator is needed to make the correlation operation faster and more efficient. Because N is usually a very large number, the hardware implementation of the parallel dot product operator has to be piecewise parallel. This can lead to a large amount of circuit area being devoted to calculation of the dot product.

Therefore a need has arisen for a more efficient method and apparatus for calculating a dot product with a large integration length.

BRIEF SUMMARY OF THE INVENTION

The present invention provides a correlator for performing a dot product operation on bits of a pseudo-noise sequence and respective data words of a data stream. Inversion circuits each receive one of the data words along with an associated pseudo-noise sequence bit and selectively invert bits of the data word responsive to its respective pseudo-noise sequence bit. An adder tree comprising a plurality of adders performs a summation of the outputs of the inversion circuits. The carry-in bit inputs of the adders are coupled to the bits of said pseudo-noise sequence bits.

The present invention provides significant advantages over the prior art. While a dot product over two vectors generally requires L multiplications and L-1 additions, the present invention does not need expensive multiplier of two's complement numbers as a normal correlator does. The carry-in ports of the adders complete the two's complement operation, thereby saving an entire level of L adders. Accordingly, gate counts and power consumption are significantly reduced.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–4 of the drawings, like numerals being used for like elements of the various drawings.

As stated above, DS-CDMA systems require a correlation operation which can be set forth as:

$$S = \sum_{k=1}^{N} D(k)PN*(k)$$

where the data $D(k)=D(k)_I+jD(k)_Q$ and pseudo-noise sequence $PN(k)=PN(k)_I+jPN(k)_Q$, "*" is the complex conjugate operator and N is the vector length of the complex data and PN vectors $D(k)_I$ is the real part of $D(k)$ and $D(k)_Q$ is the imaginary part of $D(k)$. $D(k)_I$ and $D(k)_Q$ are each M bits in width. Similarly, $PN(k)_I$ is the real part of $PN(k)$ and $PN(k)_Q$ is the imaginary part of $PN(k)$. $PN(k)_I$ and $PN(k)_Q$ are each one bit in width.

The equation above can be restated as:

$$S = S_I + jS_Q = \sum_{i=1}^{N/L}(A_i + B_i) + j\sum_{i=1}^{N/L}(C_i + D_i)$$

where $$A_i = \sum_{k=1+(i-1)L}^{iL} D_I(k)PN_I(k)$$

$$B_i = \sum_{k=1+(i-1)L}^{iL} D_Q(k)PN_Q(k)$$

$$C_i = \sum_{k=1+(i-1)L}^{iL} D_Q(k)PN_I(k)$$

$$D_i = -\sum_{k=1+(i-1)L}^{iL} D_I(k)PN_Q(k)$$

and i=1, 2, . . . N/L is the number of pieces to finish the whole N length integration and L is the width of the parallel dot product generator.

As stated above; $PN_I$ and $PN_Q$ are one bit values generated by the LFSR as a stream of "0"s and "1"s. These binary values are generally mapped to and "−1", respectively. Accordingly, using $A_i$ as an example, if $PN_I(k)=1$(i.e., $PN_I(k)$ maps to −1), then $PN_I(k)D_I(k)$ equals the two's complement of $D_I(k)$. The two's complement of an M-bit number $D_I(k)$ equals $2^M - D_I(k)$ and can also be calculated as the inversion of each bit of $D_I(k)$ and adding 1.

Figure 1:
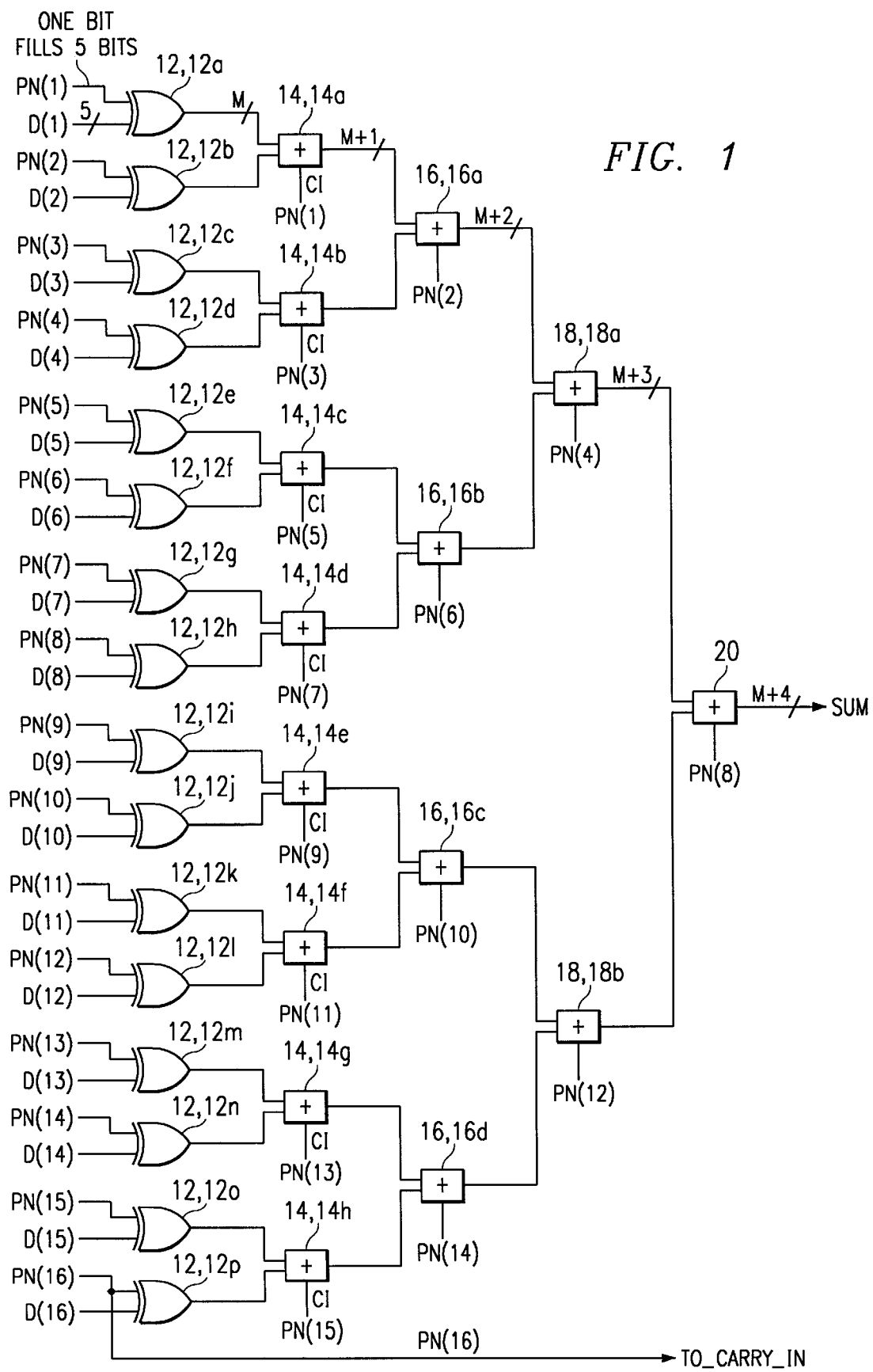
FIG. 1 illustrates a schematic diagram of an adder tree.
Figure 2:
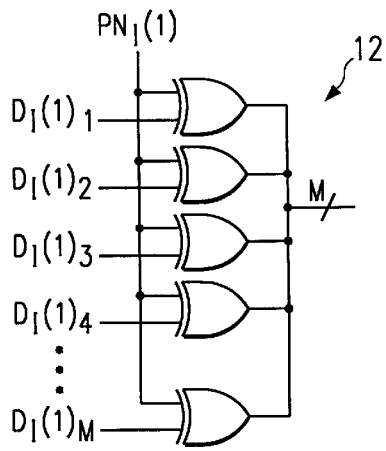
FIG. 2 illustrates a schematic diagram of multi-bit exclusive-or circuits used in the adder tree of FIG. 1.

An adder tree circuit 10 for calculating $A_i$, $B_i$, $C_i$ and $D_i$ is shown in FIG. 1. The adder tree circuit comprises a first level of L exclusive-or gates 12, individually referenced as exclusive-or gates 12a–12p. In the illustrated embodiment L=16. Each exclusive-or gate receives an M-bit value for D(k) each bit of D(k) is exclusive-or d with PN(k). The D input and PN input to each gate will depend upon whether $A_i$, $B_i$, $C_i$ or $D_i$ is being calculated. If $A_i$ is being calculated, the b inputs of the exclusive-or gates 12 will receive $D_I(1)$ through $D_I(L)$, for i=1, and the PN inputs of the exclusive-or gates 12 will receive $PN_1(1)$ through $PN_I(L)$. FIG. 2 shows an example of one such exclusive-or circuit 12a; the inputs shown would be for the calculation of $A_i$ where i=1 and k=1.

Returning to FIG. 1, the output of each exclusive-or gate 12 has an M-bit output. Pairs of exclusive-or gates 12 are coupled to the inputs of adders 14. In the illustrated embodiment, the output of gates 12a and 12b are coupled to the inputs of adder 14a, the output of gates 12c and 12d are coupled to the inputs of adder 14b, the output of gates 12e and 12f are coupled to the input of adder 14c the output of gates 12g and 12h are coupled to the inputs of adder 14d, the output of gates 12i and 12j are coupled to the inputs of adder 14e, the output of gates 12k and 12l are coupled to the inputs of adder 14f, the output of gates 12m and 12n are coupled to the inputs of adder 14g, and the output of gates 12o and 12p are coupled to the inputs of adder 14h, although the addition could be performed in any order. Each adder 14 also receives a carry in of one of the PN bits. In the illustrated embodiment, adder 14a receives bit PN(1), adder 14b receives bit PN(3), adder 14c receives bit PN(5), adder 14d receives bit PN(7), adder 14e receives bit PN(9), adder 14f receives bit PN(1), adder 14g receives bit. PN(13), and adder 14h receives bit PN(15). Again, as will be discussed in greater detail below, the order of connecting PN bits to carry in ports is not important, so long as each unique PN bit is received by an adder.

A next stage of adders 16, individually referenced as adders 16a through 16d, receives the outputs of pairs of adders 14. In the illustrated embodiment, adder 16a receives the M+1 bit outputs from adders 14a and 14b, adder 16b receives the outputs from adders 14c and 14d, adder 16c receives the outputs from adders 14e and 14f, and adder 16d receives the outputs from adders 14g and 14h. Each adder 16 also receives a unique PN bit. In the illustrated embodiment, adder 16a receives bit PN(2), adder 16b receives bit PN(6), adder 16c receives bit PN(10), adder 16d receives bit PN(14).

A third stage of adders 18, individual referenced as adders 18a and 18b, receives the outputs of pairs of adders 16. In the illustrated embodiment, adder 18a receives the M+2 bit outputs from adders 16a and 16b, adder 18b receives the outputs from adders 16c and 16d. Each adder 18 also receives a unique PN bit. In the illustrated embodiment, adder 18a receives bit PN(4), and adder 16b receives bit PN(12).

In a final stage, adder 20 receives the M+3 outputs of adders 18a and 18b, along with bit PN(8). The output of adder 20 is a M+4 bit output. The remaining PN bit which is not connected to a carry-in port of one of the adders 14–20 is passed to adders shown in FIG. 3, discussed below.

In operation, the exclusive-or gates 12 perform the (1's complement) multiplication by ±1, depending upon the value &f the associated PN bit. If the PN bit is a "0", the D bits will pass through the exclusive-or gate 12 unchanged, i.e., D will be multiplied by "1". If the PN bit is a "1", the D bits will be inverted.

After the multiplication by ±1 has occurred in the exclusive-or gates 12, the adders 14–20 perform the summation as provided in the equations for $A_i$, $B_i$, $C_i$ and $D_i$ and also complete the two's complement transformation. As discussed above, forming the two's complement of a number can be done in two steps: (1) inverting the bits of the number and (2) adding a "1" to the inverted bits. The circuit 10 uses the carry-in ports of the various adders 14–16 to provided the adding of "1"where appropriate. In cases where the PN bit is equal to "0", the carry-in will be zero and, therefore, no adding of one will occur. Where the PN bit is equal to "1", the two's complement conversion requires that the bits of the associated D bits are inverted (performed by the exclusive-or gate 12) and a "1" is added at the carry-in port of its associated adder 14–20. Since there are only L-1 adders in the circuit (fifteen in the illustrated embodiment) and L PN bits, one of the PN bits (PN(16) in the illustrated embodiment) is received by an adder outside of adder tree circuit 10. (as shown in FIG. 3).

Figure 3:
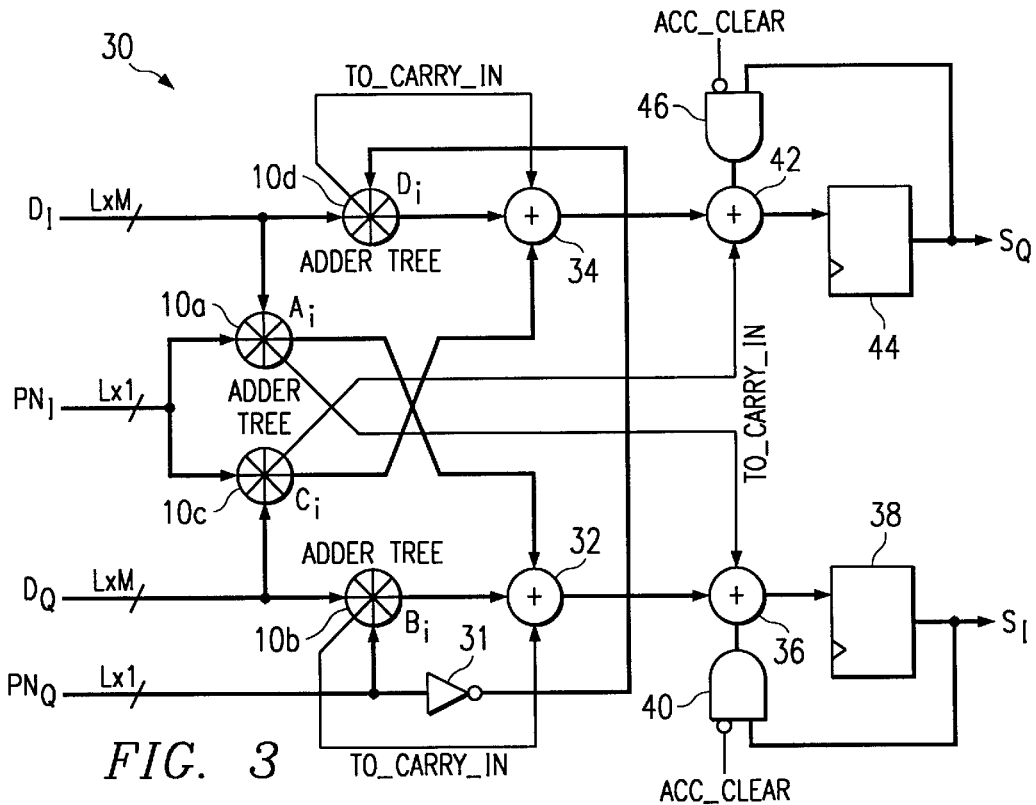
FIG. 3 illustrates a dot product operator circuit.

FIG. 3 illustrates a circuit 30 for calculating S. Circuit 30 includes four adder tree circuits 10, individually referenced as circuits 10a, 10b, 10c and 10d, to calculate $A_i$, $B_i$, $C_i$ and $D_i$, respectively. Adder tree circuit 10a receives $PN_I$ and $D_I$, adder tree circuit 10b receives $PN_Q$ and $D_Q$, adder tree circuit 10c receives $PN_I$ and $D_Q$, and adder tree circuit 10d receives $PN_Q$, through inverter 31, and $D_I$. The outputs of these circuits will be $A_i$, $B_i$, $C_i$ and $D_i$, with the exception that each output will be off by "1" if the associated PN(16) is a "1". The outputs of adder trees 10a and 10b are coupled to the inputs of adder 32. PN(16) from adder tree 10b is coupled to the carry-in port of adder 32. The, outputs of adder trees 10c and 10d are coupled to the inputs of adder 34. PN(16) from adder tree 10d is coupled to the carry-in port of adder 32. The output of adder 32 is coupled to one input of adder 36. PN(16) from adder tree 10a is coupled to the carry-in port of adder 36. The output of adder 36 is coupled to register 38. The output of register 38 is coupled to one input of AND gate 40; the second input of m-bit AND gate 40 is coupled to a ACC_CLEAR (accumulate clear) signal, where m is the bit width of $S_Q$ and $S_I$. The output of AND gate 40 is coupled to the other input to adder 36. The output of register 38 is the $S_I$ value. The output of adder 34 is coupled to one input of adder 42. PN(16) from adder tree 10c is coupled to the carry-in port of adder 42. The output of adder 42 is coupled to register 44. The output of register 44 is coupled to one input of m-bit AND gate 46; the second input of AND gate 46 is coupled to the ACC_CLEAR (accumulate clear) signal. The output of AND gate 46 is coupled to the other input to adder 42. The output of register 44 is the $S_Q$ value.

Figure 4:
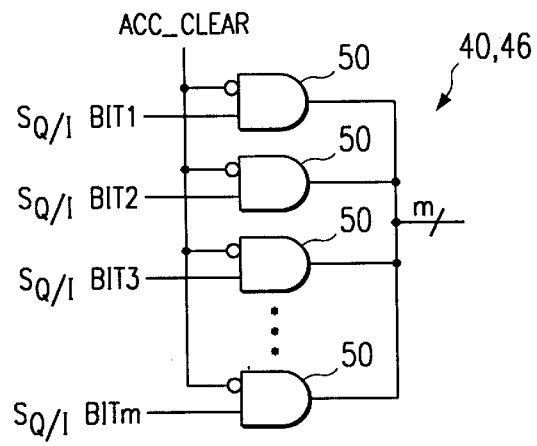
FIG. 4 illustrates a multi-bit AND gate used in the circuit of FIG. 3

AND Gates 40 and 46 are shown in greater detail in connection with FIG. 4. Each bit of the $S_Q$ output, for AND gate 46, and each bit of the $S_I$ output, for AND gate 40 is coupled to one input of an AND gate 50; the other input of each AND gate 50 is coupled to the ACC_CLEAR signal. This is provided to clear the contents of the accumulating registers 38 and 44.

In operation, the circuit shown in FIGS. 3 and 4 works as follows. Adders 32 and 34 calculate $A_i+B_i$ and $C_i+D_i$, respectively (with the exception of adding PN(16) bits from adder trees 10a and 10c, which are added into the sum by adders 36 and 42). Adders 36 and 42, along with registers 38 and 44 accumulate the values of $A_i+B_i$ and $C_i+D_i$ for N/L cycles to compute $S_I$ and $S_Q$.

Figure 5:
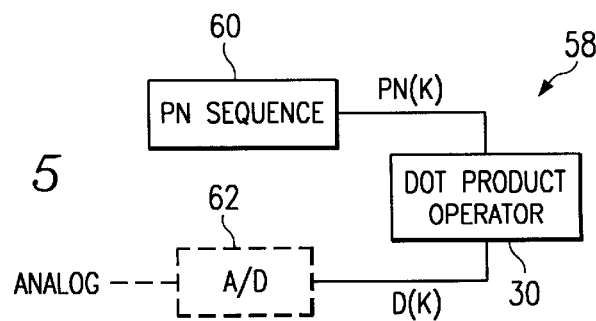
FIG. 5 illustrates a spread spectrum device using the dot product operator circuit of FIG. 3.

FIG. 5 illustrates a block diagram of a spread spectrum device 58 incorporating the circuit 30 of FIG. 3. A pseudo-noise generator 60 outputs a sequence of pseudo-noise words PN(k) too circuit 30 along with data steam D(k). Data stream D(k) could be any digital-data stream which would benefit from communication using spread spectrum techniques, such as an analog communication signal, which is translated to a digital signal by A/D (analog to digital) converter 62, or a native digital signal such as the output of a computing device. The digital data stream D(k) and the pseudo-noise sequence PN(k) are combined to output S, as described above.

The present invention provides significant advantages over the prior art. While a dot product over two vectors generally requires L multiplications and L-1 additions; the present invention does not need expensive multiplier of two's complement numbers as a normal correlator does. By utilizing the carry-in ports of the adders to complete the two's complement operation, a whole level of L M-bit wide adders is saved. Accordingly, gate counts and power consumption are significantly reduced.

For illustration purposes, the circuitry has been shown with specific L and M values, but the circuit could easily expanded or reduced to accommodate L and M values other than those shown. Further, while the implementation has been described for a N with is an integer power of 2, other values of N could be accommodated as well.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A correlator for performing a dot product operation on bits of a pseudo-noise sequence and respective data words of a data stream, comprising:

a plurality of inversion circuits, each inversion circuit for selectively inverting bits of a respective data word responsive to the data word's associated pseudo-noise sequence bit; and a binary adder tree comprising a plurality of adders for performing a summation of the outputs of said inversion circuits, each of said adders having a carry-in input coupled to a single respective pseudo-noise sequence bit.

2. The correlator of claim 1 wherein said inversion circuits comprise exclusive-or gates.

3. The correlator of claim 2 wherein said inversion circuits each comprise a plurality of exclusive-or gates, each gate inputting a respective bit of one of said data words and each inputting the associated pseudo-noise sequence bit respective to said data word.

4. The correlator of claim 1 and further comprising an accumulator circuit for accumulating the output of said adder tree.

5. The correlator of claim 4 wherein said accumulator comprises a register coupled to an input and an output of an adder.

6. A correlator for performing a dot product operation on bits of a pseudo-noise sequence and respective data words of a data stream, comprising:

a plurality of inversion circuits, each inversion circuit for selectively inverting bits of a respective data word responsive to the data word's associated pseudo-noise sequence bit;

a binary adder tree comprising a plurality of adders for performing a summation of the outputs of said inversion circuits, each of said adders having a carry-in input coupled to a single respective pseudo-noise sequence bit; and an accumulator circuit for accumulating the outputs of said adder trees, said accumulator comprising a register coupled to an input and an output of an adder, said adder having a carry-in bit input coupled to one of said pseudo-random sequence bits.

7. A method of performing a dot product operation on bits of a pseudo-noise sequence and respective data words of a data stream, comprising:

selectively inverting bits of each data word responsive to its associated pseudo-noise sequence bit; and summing said selectively inverted data words in a binary adder tree comprising a plurality of adders, each of said adders having a carry-in input coupled to a single respective pseudo-noise sequence bit.

8. The method of cairn 7 wherein selectively inverting step comprises the step of performing an exclusive-or operation on each bit of the data word and the bit of the pseudo-random sequence associated with the data word.

9. The method of claim 7 and further comprising accumulating the output of said adder tree.

10. The method of claim 9 wherein said accumulating step comprises storing an accumulated sum in a register for combining with the output of an adder tree.

11. A method of performing a dot product operation on bits of a pseudo-noise sequence and respective data words of a data stream, comprising:

selectively inverting bits of each data word responsive to its associated pseudo-noise sequence bit;

summing said selectively inverted data words in a binary adder tree comprising a plurality of adders, each of said adders having a carry-in input coupled to a singe respective pseudo-noise sequence bit; and accumulating the outputs of said adder tree, said adder tree comprising a plurality of adders each having a carry-in bit input receiving one of said pseudo-random sequence bits.

12. A spread spectrum device, comprising:

circuitry for generating a stream of data words;

a pseudo-noise sequence generator for generating a pseudo-noise sequence; and a correlator for performing a dot product operation on bits of said pseudo-noise sequence and respective data words, comprising:
  a plurality of inversion circuits, each inversion circuit for selectively inverting bits of a respective data word responsive to the data word's associated pseudo-noise sequence bit, and
  a binary adder tree comprising a plurality of adders for performing a summation of the outputs of said inversion circuits, each of said adders having a carry-in input coupled to a single respective pseudo-noise sequence bit.

13. The spread spectrum device of claim 12 wherein said circuitry for generating a stream of data words includes an analog to digital converter.

14. The spread spectrum device of claim 12 wherein said inversion circuits comprise exclusive-or gates.

15. The spread spectrum device of claim 14 wherein said inversion circuits each comprise a plurality of exclusive-or gates, each gate inputting a respective bit of one of said data words and each inputting the associated pseudo-noise sequence bit respective to said data word.

16. The spread spectrum device of claim 12 and further comprising an accumulator circuit for accumulating the output of said adder tree.

17. The spread spectrum device of claim 16 wherein said accumulator comprises a register coupled to an input and an output of an adder.

18. A spread spectrum device, comprising:
  circuitry for generating a stream of data words;
  a pseudo-noise sequence generator for generating a pseudo-noise sequence; and
  a correlator for performing a dot product operation on bits of said pseudo-noise sequence and respective data words, comprising:
    a plurality of inversion circuits, each inversion circuit for selectively inverting bits of a respective data word responsive to its the data word's associated pseudo-noise sequence bit;
    a binary adder tree comprising a plurality of adders for performing a summation of the outputs of said inversion circuits, each of said adders having a carry-in input coupled to a single respective pseudo-noise sequence bit; and
    an accumulator circuit for accumulating the output of said adder tree, said accumulator comprising a register coupled to an input and an output of an adder, wherein said adder has a carry-in bit input coupled to one of said pseudo-random sequence bits.

19. The correlator of claim 4 wherein said accumulator circuit accumulates the output of said adder tree and the output of at least one additional adder tree.

20. The method of claim 9 wherein said accumulator circuit accumulates the output of said adder tree and the output of at least one additional adder tree.

21. The spread spectrum device of claim 16 wherein said accumulator circuit accumulates the output of said adder tree and the output of at least one additional adder tree.

* * * * *